(12) United States Patent
Luinge

(10) Patent No.: US 11,027,952 B2
(45) Date of Patent: Jun. 8, 2021

(54) LIFTING SYSTEM FOR LIFTING A VEHICLE AND METHOD FOR OPERATING THE LIFTING SYSTEM

(71) Applicant: Stertil B.V., Kootstertille (NL)

(72) Inventor: Johan Luinge, Oosterwolde (NL)

(73) Assignee: Stertil B.V., Kootstertille (NL)

( * ) Notice: Subject to any disclaimer, the term of this patent is extended or adjusted under 35 U.S.C. 154(b) by 0 days.

(21) Appl. No.: 14/902,984

(22) PCT Filed: Jul. 3, 2014

(86) PCT No.: PCT/NL2014/050439
§ 371 (c)(1),
(2) Date: Jan. 5, 2016

(87) PCT Pub. No.: WO2015/005772
PCT Pub. Date: Jan. 15, 2015

(65) Prior Publication Data
US 2016/0185580 A1   Jun. 30, 2016

Related U.S. Application Data

(60) Provisional application No. 61/844,641, filed on Jul. 10, 2013.

(30) Foreign Application Priority Data

Jul. 10, 2013   (NL) ..................................... 2011132

(51) Int. Cl.
*B66F 3/46*         (2006.01)
*B66F 7/20*         (2006.01)
(Continued)

(52) U.S. Cl.
CPC .................. *B66F 3/46* (2013.01); *B66F 7/16* (2013.01); *B66F 7/20* (2013.01); *B66F 7/28* (2013.01); *B66F 9/20* (2013.01); *B66F 17/00* (2013.01)

(58) Field of Classification Search
CPC ............... B66F 3/46; B66F 7/28; B66F 17/00
(Continued)

(56) References Cited

U.S. PATENT DOCUMENTS 2,015,357 A * 9/1935 Weaver ..................... B66F 7/16
                                                              187/205
3,271,006 A * 9/1966 Brown ...................... B66F 7/28
                                                              254/2 B
(Continued)

FOREIGN PATENT DOCUMENTS

CN        1627722 A    6/2005
GB        2310519 A    8/1997
(Continued)

*Primary Examiner* — Patrick J Maestri
*Assistant Examiner* — Joseph J. Sadlon
(74) *Attorney, Agent, or Firm* — The Webb Law Firm

(57) ABSTRACT

The invention relates to a lifting system for lifting a load, such as a vehicle, and a method for lifting a load. The lifting system includes: one or more lifting devices; a group controller arranged to operate the lifting devices; and a user interface unit including a transmitter and/or receiver configured for communication with the group controller, a processor, a display device, and input means configuring the user interface unit to receive user input. The user interface unit is adapted to communicate command signals to the group controller on basis of the user input and adapted to receive and display information obtained from the group controller. The lifting system includes a network interface unit including a network transmitter and/or network receiver configured for communication to an external network.

20 Claims, 12 Drawing Sheets

(51) Int. Cl.
    *B66F 7/28* (2006.01)
    *B66F 17/00* (2006.01)
    *B66F 9/20* (2006.01)
    *B66F 7/16* (2006.01)

(58) Field of Classification Search
    USPC .................................. 414/800; 254/89 R
    See application file for complete search history.

(56) References Cited

U.S. PATENT DOCUMENTS

| | | | |
|---|---|---|---|
| 3,289,868 A * | 12/1966 | Miller | B65D 90/143 |
| | | | 254/45 |
| 4,595,331 A * | 6/1986 | Thompson | B65G 67/20 |
| | | | 180/168 |
| 4,638,886 A | 1/1987 | Marietta | |
| 4,937,795 A * | 6/1990 | Motegi | A41D 13/00 |
| | | | 340/539.1 |
| 5,012,898 A | 5/1991 | Tsymberov | |
| 5,257,177 A * | 10/1993 | Bach | B66C 13/066 |
| | | | 340/685 |
| 5,584,224 A | 12/1996 | Davies et al. | |
| 5,676,385 A | 10/1997 | Schneider et al. | |
| 6,050,768 A * | 4/2000 | Iwasaki | H01L 21/67276 |
| | | | 414/222.01 |
| 6,279,685 B1 * | 8/2001 | Kogan | B66F 7/20 |
| | | | 187/203 |
| 6,286,629 B1 * | 9/2001 | Saunders | B66B 9/0853 |
| | | | 187/394 |
| 6,315,079 B1 | 11/2001 | Berends et al. | |
| 6,628,649 B1 * | 9/2003 | Raj | H04L 45/10 |
| | | | 370/360 |
| 6,632,068 B2 * | 10/2003 | Zinger | H01L 21/67379 |
| | | | 414/800 |
| 6,634,461 B1 | 10/2003 | Baker | |
| 6,763,916 B2 | 7/2004 | Green et al. | |
| 6,817,449 B2 | 11/2004 | Berends | |
| 6,840,351 B2 | 1/2005 | Wanner | |
| 6,863,159 B2 | 3/2005 | Rauch | |
| 6,907,317 B2 | 6/2005 | Peshkin et al. | |
| 6,928,336 B2 | 8/2005 | Peshkin et al. | |
| 6,964,322 B2 | 11/2005 | Green et al. | |
| 6,983,196 B2 * | 1/2006 | Green | B66F 7/04 |
| | | | 254/45 |
| 7,014,012 B2 | 3/2006 | Baker | |
| 7,025,178 B2 | 4/2006 | Wengelski et al. | |
| 7,191,038 B2 * | 3/2007 | Green | B66F 7/04 |
| | | | 254/45 |
| 7,219,770 B2 | 5/2007 | Baker | |
| 7,500,816 B2 | 3/2009 | Berends et al. | |
| 7,610,108 B2 * | 10/2009 | Boe | G05B 13/027 |
| | | | 318/560 |
| 7,644,807 B2 | 1/2010 | Finkbeiner | |
| 7,740,109 B2 | 6/2010 | Moller et al. | |
| RE41,554 E | 8/2010 | Baker | |
| 7,813,782 B2 * | 10/2010 | Cable | A61B 5/0059 |
| | | | 128/203.12 |
| 8,028,973 B2 | 10/2011 | Ford et al. | |
| 8,083,034 B2 | 12/2011 | Bordwell et al. | |
| 8,139,508 B1 * | 3/2012 | Roskind | H04L 12/433 |
| | | | 370/255 |
| 8,191,865 B2 | 6/2012 | Polins et al. | |
| 8,256,577 B2 * | 9/2012 | Kritzer | B66F 3/46 |
| | | | 187/215 |
| 8,442,659 B2 * | 5/2013 | Wagner | H01L 21/67766 |
| | | | 356/237.4 |
| 8,509,060 B1 * | 8/2013 | Dong | H04L 45/12 |
| | | | 370/221 |
| 8,567,761 B2 * | 10/2013 | De Jong | B66F 3/46 |
| | | | 254/134 |
| 8,583,491 B2 * | 11/2013 | Feldman | E04H 3/04 |
| | | | 343/893 |
| 8,708,107 B2 * | 4/2014 | Finkbeiner | B66F 7/20 |
| | | | 187/213 |
| 8,868,221 B1 * | 10/2014 | Mealy | G05B 13/027 |
| | | | 700/117 |
| 8,971,209 B2 * | 3/2015 | Magnuson | H04W 24/02 |
| | | | 370/216 |
| 8,995,251 B2 * | 3/2015 | Huang | H04L 45/023 |
| | | | 370/221 |
| 9,061,872 B2 * | 6/2015 | Finkbeiner | B66F 3/46 |
| 9,334,145 B2 * | 5/2016 | Fagan | B66F 3/46 |
| 2004/0149520 A1 * | 8/2004 | Taylor | B66F 7/28 |
| | | | 187/203 |
| 2005/0182522 A1 * | 8/2005 | Chase | B66F 7/04 |
| | | | 700/275 |
| 2006/0182563 A1 | 8/2006 | De Jong et al. | |
| 2007/0088463 A1 | 4/2007 | Green et al. | |
| 2008/0224107 A1 * | 9/2008 | Polins | B66B 9/16 |
| | | | 254/45 |
| 2009/0242333 A1 | 10/2009 | Finkbeiner | |
| 2010/0066278 A1 | 3/2010 | De Jong | |
| 2010/0108445 A1 * | 5/2010 | Kritzer | B66F 3/46 |
| | | | 187/218 |
| 2010/0160750 A1 * | 6/2010 | White | A61B 5/0075 |
| | | | 600/322 |
| 2011/0037041 A1 | 2/2011 | DeJong et al. | |
| 2011/0097187 A1 | 4/2011 | Kelley et al. | |
| 2012/0048653 A1 | 3/2012 | Matthews et al. | |
| 2012/0067672 A1 | 3/2012 | Nussbaum | |
| 2013/0001486 A1 | 1/2013 | Finkbeiner et al. | |
| 2013/0240300 A1 † | 9/2013 | Fagan | |
| 2014/0161583 A1 * | 6/2014 | Luinge | B66F 7/28 |
| | | | 414/800 |

FOREIGN PATENT DOCUMENTS

| | | |
|---|---|---|
| WO | 2009099322 A1 | 8/2009 |
| WO | 2011069599 A1 | 6/2011 |

\* cited by examiner
† cited by third party

LIFTING SYSTEM FOR LIFTING A VEHICLE AND METHOD FOR OPERATING THE LIFTING SYSTEM

CROSS-REFERENCE TO RELATED APPLICATIONS

This application is the United States national phase of International Application No. PCT/NL2014/050439 filed Jul. 3, 2014, and claims priority to Netherlands Patent Application No. 2011132 filed Jul. 10, 2013, and U.S. Provisional Patent Application No. 61/844,641 filed Jul. 10, 2013, the disclosures of which are hereby incorporated in their entirety by reference.

BACKGROUND OF THE INVENTION

Field of the Invention

The present invention relates to a lifting system for lifting a load, such as a vehicle, with one or more lifting devices. Such lifting devices are in particular used for lifting motor vehicles including buses and trucks and may relate to lifting columns of the two-post lift type with pivoting support arms, the four-post lift type with runways, the mobile type etc.

Description of Related Art

A lifting device known from practice comprises a frame with a carrier that is connected to a drive for moving the carrier upwards and downwards. In the ascent mode hydraulic oil is pumped to a cylinder for lifting the carrier, and thereby the vehicle. In the descent mode the carrier with the vehicle is lowered and hydraulic oil returns to the reservoir.

Conventional lifts usually involve a simple interface, permitting a user to either raise or lower the lift, and the vehicle thereon, by pushing one button to raise the column or a second button to lower the column. These interfaces are attached to or in close proximity of the column, requiring a user to not only be in the same area as the lift, but often requiring the user to be immediately adjacent to the lift, which raises functionality and safety concerns. Moreover, these rudimentary interfaces lack any ability to provide the user with information about the state of the vehicle, for example, whether the vehicle is at an angle that would be unstable or unsafe. Such lifting system is disclosed in US 2010/0066278 and U.S. Pat. No. 7,500,816, for example.

U.S. Pat. No. 6,983,196 discloses a lift system with a first processor for control of the lifting system and a second processor being used of display of data. This data can be received from a computer network. This requires different processors thereby introducing additional hardware to the lifting system. Also, access to the lifting system, and more specifically control and monitoring of the lifting operation is limited.

Conventional lifting systems with multiple columns introduce additional concerns, for example the ability to accurately and safely control multiple columns to prevent a vehicle from becoming unstable on the columns, unauthorized control of the lifting system, unneeded lifting operations.

The present invention has for its object to provide a lifting system for a set of lifting columns obviating or at least reducing the aforementioned problems.

SUMMARY OF THE INVENTION

This objective is achieved with a lifting system for a set of lifting devices, the control system comprising:

one or more lifting devices operable to raise and lower a vehicle;

a group controller arranged to operate the lifting devices;

a user interface unit comprising a transmitter and/or receiver configured for communication with the group controller, a processor, a display device, and input means configuring the user interface unit to receive user input, wherein the user interface unit being adapted to communicate command signals to the group controller on basis of the user input and adapted to receive and display information obtained from the group controller; and a network interface unit comprising a network transmitter and/or network receiver configured for communication to an external network, and a connection configured for communication with the group controller.

The lifting system may involve different kinds of lifting devices including two-post, four-post, mobile, and wireless lifting columns. The system has at least one lifting device, and preferably more lifting devices, such as two lifting columns, although the system can for instance also have four, six or eight lifting columns or a multiple thereof.

The group controller communicates with each of the selected lifting devices, such as mobile lifting columns. The group controller uses wired or preferably wireless communication using one or more transmitters and/or receivers.

The group controller of the lifting system according to the invention can be provided centrally or, alternatively, can be located in one of the lifting devices, for example one of the lifting columns, or even in a plurality of lifting columns. In an alternative embodiment the group controller can be provided at a central point in the workplace or work shop from where the control can be operated. This enables the use of one group controller for a number of lifting systems. This is an advantage when using a number of mobile lifting columns in changing sets or configurations in a work shop.

The user interface enables the user to provide information, such as operating instructions and/or identification data, to the group controller and/or external network. In fact, the user interface is adapted to communicate command signals to the group controller on basis of user input. The user may provide such user input through the use of buttons, keyboard and/or preferably a touch screen. In a presently preferred embodiment the display device comprises touch-sensitive display and more preferably with the touch sensitive display being adapted to receive multi-touch input. This improves the possibilities for a user to communicate with the lifting system and/or external network.

Communication with an external network is achieved with the network interface unit. This enables wired and/or wireless communication with one or more external networks. Such external networks may include one or more of the following: service and maintenance network of the lifting device manufacturer, accounting network of the factory using the lifting system, and authorization and logging network of the work shop where the lifting system is located.

In one of the preferred embodiments the communication involves one or more of the following: vehicle documentation, tasks, health and safety information, service and maintenance indication, software updates, utilisation data, authorization and identification data, position data.

Vehicle documentation can be provided to the user on the display of a lifting device. This enables direct access for the operator to relevant information of the vehicle to be lifted. The documentation is provided from a server with a storage facility capable of storing relevant vehicle documentation.

Tasks may relate to information of scheduling work or job orders, detailed order information, time budget, and/or recording hours of labour on a work or job order etc. This information may be provided by a server with a storage facility capable of storing relevant information and/or may be provided to such server by the group controller.

Health and safety information relates to providing information on safety measures and/or providing the user with health and safety concerns, for example. Additionally, or alternatively, this information may relate to sending warning signals and/or warning recordings to a server with a storage facility capable of storing relevant information.

Service and maintenance indication relates to keeping records of the utilisation data of the lifting system according to the invention and providing the operator and/or maintenance people with a service indication after reaching a number of lifts and/or after a specific time interval. In a presently preferred embodiment the group controller provides a service message by the network interface unit to the maintenance people. These maintenance people may involve a maintenance company and/or manufacturer of the lifting systems according to the invention.

Software updates are enabled through the network interface unit by externally from a server providing update information to the group controller. The group controller receives the update to improve the operation of the lifting system. This enables a remote software update.

Utilisation data relates to data representing the use of the lifting system such as the number of lifts, specific loads, and/or length of time intervals wherein the lifting system according to the invention is in use. The utilisation is provided to a server by the network interface unit. This enables a "pay-per-lift" system wherein the operator or factory using the lifting system pays for the lifting system depending on the use thereof. Optionally, utilisation data may involve so-called pawl-monitoring. Such pawl or security pawl is a type of notch that is capable of holding/locking the load. When loaded the pawl can not be retracted. This situation occurs when the user removes the pressure from the hydraulic system to lower the load. When the security pawl is applied and activated the load needs to be lifted over a (very) small distance to enable unlatching the pawl such that the pawl can be retracted. Then the lowering can take place. Pawl-monitoring provides information about the operation of the pawl and facilitates the lowering operation. For example, the user pushes the lowering button. The system activates unlatching magnets and monitors the retraction of the pawls. The lifting columns with locked or jammed pawls are lifted over a small distance to release the load and their retraction is checked again. With retracted pawls the lowering is started. Pawl-monitoring may involve a switch and/or detecting a difference in magnetising current. Furthermore, in an optional embodiment, the pawl-monitoring is combined with pressure-monitoring. For example, when a load is lifted the system checks which lifting device or column is without pressure and provides a rising command until the device is pressurized again. Furthermore, in an alternative embodiment, alternative to or in combination with the pressure-monitoring, the pawl-monitoring is combined with height-monitoring. Columns with locked or jammed pawls are lifted over a small distance, such as 1-2 mm, to enable retracting of the pawls. Pawl-monitoring provides additional safety for the lifting system and/or provides increased ease of use. Optionally, the system can be provided with a first lowering button for lowering the load with retracted pawls, and a second lowering button for lowering the load with activated pawls. The pawl-monitoring functionality may be provided for a lifting system described in the present application or, alternatively, for conventional lifting systems to provided additional safety and/or ease of use.

Authorization and identification data relates to data enabling a specific user to start using the lifting system. For example, a user identifies himself at one of the lifting devices through the user interface unit. In a preferred embodiment this identification data is communicated via the group controller and the network interface unit to an external network. In case the user is not authorized operation of the lifting system can be blocked by providing a corresponding external command to the group controller. In case the user is authorised a release or clearance command is communicated to the group controller and the user may start to operate the lifting system.

Position data relates to specific information on the location or position of individual lifting devices. This position data can be used when selecting the lifting devices for co-operating in a lifting operation. This may be especially useful in case of mobile lifting columns with the lifting system having a changing configuration and/or number of mobile lifting columns in one set. Such configuration may depend on the type of vehicle, for example.

In a preferred embodiment according to the present invention the communication means comprise at least one transmitter/receiver provided on each of the lifting devices, in particular on each of the lifting columns.

In an advantageous preferred embodiment according to the present invention the group controller communicates with the lifting devices using wireless communication. Preferably, also the user interface unit and network interface unit communicate wireless.

The use of wireless communication means enables optimal utilization of the flexibility of mobile lifting columns. Per se known wireless communication means are usually based on the use of electromagnetic radiation, such as Bluetooth and WiFi. However, the system preferably makes use of transmission in an ultra wide band, so-called Ultra Wideband (UWB). Data for transmission is here transmitted in packets distributed over a wide frequency band. It is hereby possible to transmit such packets in parallel. This UWB technology usually makes use of short pulses to transmit the data. A definition of UWB employed in practice identifies this technology with radio signals having a bandwidth greater than the smallest value of 500 MHz, or 20% of the centre frequency. UWB can for instance be used in the frequency domain of 3.1-10.6 GHz. At a relatively low power the use of UWB technology is possible in a range up to several tens of meters. This already suffices for many applications of the system according to the invention. If desired, the range can be increased by using a higher power. A further advantage of the use of UWB technology is that these signals are disrupted less by obstacles, dividing walls etc. than other wireless networks such as WiFi and Bluetooth.

In a presently preferred embodiment according to the invention the group controller comprises a communication optimiser for determining an appropriate communication route in the lifting system.

By providing a communication optimiser the system may choose between several available communication routes in the lifting system between individual lifting devices, such as lifting columns. These available routes may involve direct communication between the sending lifting device and the intended receiving lifting device. Alternative routes may involve indirect routes via other, intermediate lifting devices. Use can be made of one or more intermediate lifting device. This enables communication in a type of mesh-network communication configuration. An intermediate lifting device receives the communication message and forwards it. In a presently preferred embodiment the intermediate lifting device does not perform any further action with the communication. The choice for a specific route can be made by the group controller and/or can be made automatically depending on whether the intended receiving lifting device has actually received the communication. For example, in absence of a receipt confirmation of the intended receiving lifting device within a specified time period alternative routes can be used. Optionally, all routes are initially used and sending/broadcasting/forwarding communication is stopped after a receipt confirmation has been broadcasted by the intended receiving lifting device. It will be understood that other protocols can also be used in accordance with the present invention.

In a further preferred embodiment according to the present invention, the group controller comprises a graphical interface builder configured for building appropriate graphical interface in response to the selected lifting devices in the lifting system.

The application of a graphical interface builder that is integrated in an embodiment of a lifting system according to the invention provides optimal flexibility for configuration of the lifting system. For example, in a lifting system with mobile lifting columns the number of lifting columns that is included in the lifting system for a specific lifting operation may depend on the actual operation, for example lifting a truck or a car. The graphical interface builder provides a Graphical User Interface (GUI) that is up to date and enables the lifting system to provide the user with relevant information about the lifting system. This improves the awareness of the user about the lifting system that is used at that moment. It will prevent mistakes by the user as the actual situation with selected lifting devices can be presented. This improves the flexibility of the lifting system, provides the user with only the relevant information of the lifting system preferably only including the selected lifting devices, and may prevent mistakes when the user provides input to the lifting system using the integrally provided graphical interface.

In a presently preferred embodiment the control system further comprises an ID-reader. The ID-reader, configured to operate with an ID-key, ID-card, digital signature, fingerprint or other biometrical means, voice activation, password etc., is used by the user of the lifting system to identify himself to the system and enable access to it to enable operation of the lifting system and/or maintenance and repair.

Preferably, the identification data is provided to the user interface. In a possible embodiment according to the invention authorization of the user and preferably also release or clearance of the lifting system is requested from an external network as mentioned earlier.

In a presently preferred embodiment the lifting system further comprises a breath analyser. Providing a breath analyser enables a check on the capabilities of the user to operate the lifting system. For example, when starting the lifting system or continuing operating the lifting system after a work break, the user has to utilise the breath analyser. After checking the system is released and the user may start operating the lifting system. This provides additional safety when using the lifting system according to the invention.

In a presently preferred embodiment the control system comprises position-determining means for carrying out a location determination of each lifting device;

The position-determining means preferably comprise at least one transmitter/receiver provided on each of the lifting columns.

In a presently preferred embodiment of the invention the selection of the lifting columns takes place on the basis of the position determination following from the position-determining means. In case the position of an individual lifting column is known from the position-determining means, a user can select the required lifting columns, which are for instance already situated closest to the required position, in simple manner from the control system. Optionally, this selection can be performed automatically by the control system, for instance depending on the type of vehicle. The user is not required to walk through the space along the individual lifting columns. After the selection on the basis of the position of the lifting columns the user can control each lifting column from the control system according to the invention. For this purpose each lifting column is identified in unique manner such that the control unit can send commands to all selected lifting columns as well as to one or more individual lifting columns. Such identification can be set permanently for each individual lifting column. This can take place once-only, although it can also take place after each start-up of the system. For this purpose use can for instance be made of the touch screen functionality of the control system. If desired, such an identification can be linked to an individual user such that it is for instance always visible which lifting column is being used at that moment by which user/mechanic.

An additional advantage of the system according to the invention is that, after the lowered vehicle has been removed, the selection can be maintained for a subsequent vehicle. In known mobile systems this selection is aborted, for instance by an end switch on the travel mechanism of the lifting column. This switch aborts the selection after a displacement of the column.

In a preferred embodiment according to the present invention the system comprises identification means co-acting with the controller unit for identifying at least each selected lifting device on the basis of the position determinations.

The lifting columns can be identified in unique manner by performing the identification of particularly the selected lifting columns on the basis of the positions determined using the position-determining means. It is preferably not necessary for users themselves to identify the lifting columns. These identifications are preferably carried out in automatic manner by the control unit.

The position-determining means can for instance make use of GPS technology for the purpose of thereby determining the position of a lifting column in the space. It is for instance also possible to make use of infrared signals and/or RF signals. These technologies can optionally be applied in combination in the system according to the invention.

In a preferred embodiment according to the present invention the position-determining means comprise at least one transmitter/receiver provided on each of the lifting columns.

In a further preferred embodiment according to the present invention at least one lifting device is configured in the system as master device and at least one lifting device as slave device.

A master device can be used to select the other devices in its group. These other devices then function as slave devices.

In this way all the advantages can thus be gained as in a control which distinguishes master devices and slave devices.

In an advantageous preferred embodiment according to the present invention the lifting devices of the system form a plurality of groups and/or sub-groups. Simultaneous inspection, repair or any operation which may be necessary for a plurality of vehicles is hereby possible. For this purpose a plurality of groups can be operated by the system independently of each other. By making use of a sub-group it is possible to give some of the selected lifting devices in a group a different command relative to the other lifting devices in the same group. There is thus the possibility, among others, of two lifting devices forming a lifting unit for jointly moving for instance an axle of a vehicle, wherein the control unit selects and controls the lifting unit on the basis of the position information from the position-determining means. The lifting unit here forms a kind of sub-group within the group of selected lifting devices. If desired, each group of lifting devices can have a master column, or for instance make use of a multi-master system.

The invention further relates to a method for operating a lifting system, comprising the step of providing a lifting system as described above.

The same effects and advantages apply for the method as described for the lifting system and/or the control system.

Preferably, the method further comprises the steps of:
generating a graphical user interface (GUI) from at least one processor, the GUI being displayed in at least one display device of the user interface unit;
receiving input from at least one user; and
altering at least one function of the lift based on the input of at least one user.

Generating a graphical user interface enhances the information available to the user. Optionally, in case of a lifting system with lifting columns that need to be selected by the user such interface is automatically adapted to the selected lifting columns. In a presently preferred embodiment the method comprises the additional step of remotely accessing the user interface unit. This improves the flexibility of the system.

In a further preferred embodiment the method involves using an optimal communication route involving either direct communication between the sending and intended receiving lifting device, or indirect communication via one or more intermediate lifting devices. Such optimal mesh network configuration provides an improved robustness when communicating within the lifting system.

In a further preferred embodiment the method further comprises the steps of:
identifying a user by associating the user with an ID-means presented to an ID-reader; and
receiving user input associated with system settings on the display.

These steps provide additional functionality to the system as will illustrated when discussing embodiments of the invention.

BRIEF DESCRIPTION OF THE DRAWINGS

Further advantages, features and details of the invention are elucidated on the basis of preferred embodiments thereof, wherein reference is made to the accompanying drawings, in which.

DETAILED DESCRIPTION OF THE INVENTION

Figure 1:
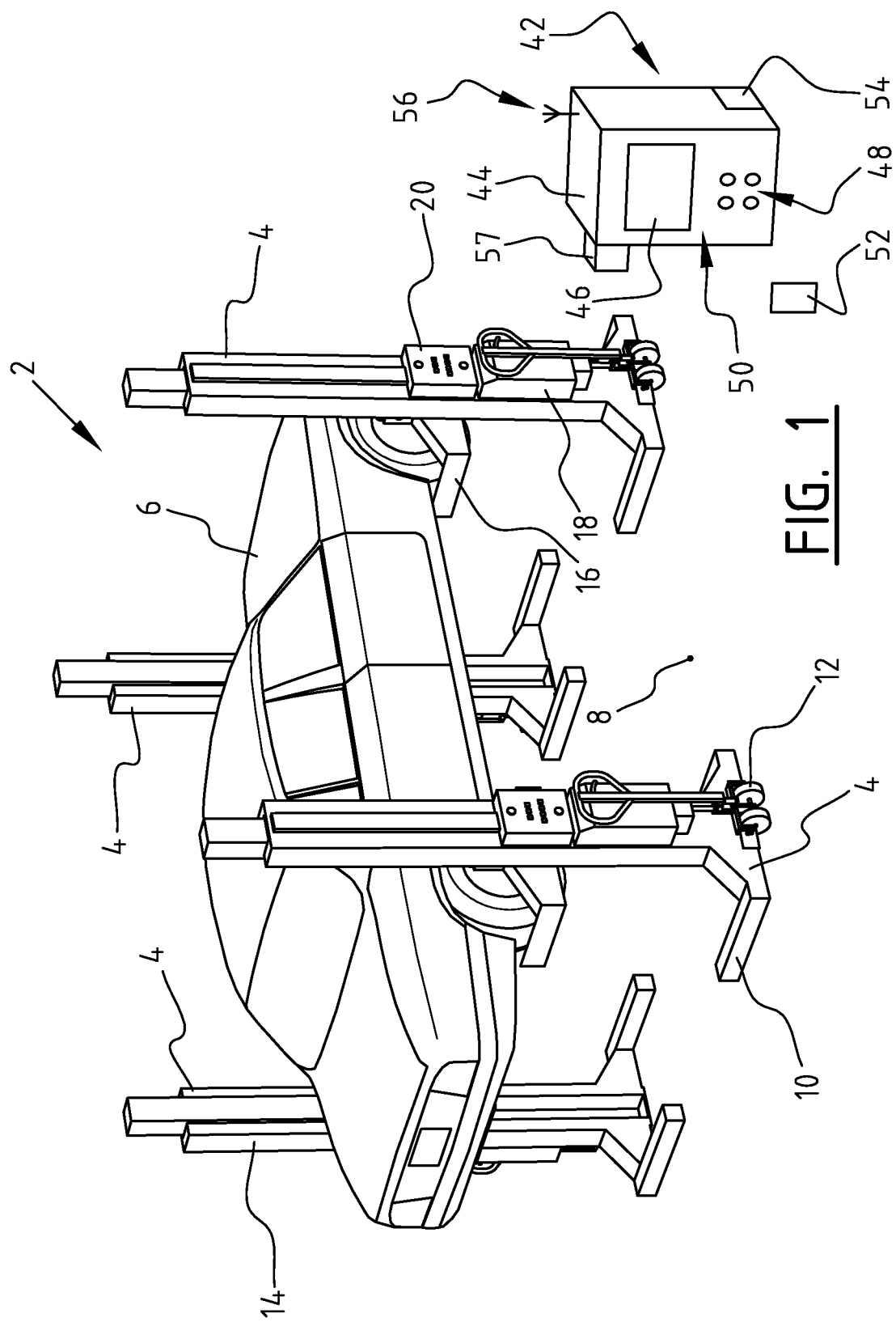
FIG. 1 shows a schematic overview of a vehicle lifted by lifting columns according to the invention.

The following description is merely exemplary in nature and is in no way intended to limit the invention, its application, or uses. While the disclosure is described as having exemplary attributes and applications, the present disclosure can be further modified. This application is therefore intended to cover any variations, uses, or adaptations of the disclosure using its general principles. Further, this application is intended to cover such departures from the present disclosure as come within known or customary practice of those skilled in the art to which this disclosure pertains and which fall within the limits of the appended claims. Accordingly, the following description of certain embodiments and examples should be considered merely exemplary and not in any way limiting.

The lift control system of the present invention is suitable for use with lift systems comprising any number of lifting devices that require height control columns, including without limitation scissor lifts and systems having one, two or four columns. The columns may achieve lifting and lowering capability by any means known to those of skill in the art, including hydraulically, electrically, mechanically, and electromechanically. Lift systems compatible with the present lift control system may be stationary and/or permanently affixed or attached to a certain location or may be mobile, capable of being transported via wheels or any other suitable means known to those in the art. With reference to the figures, like element numbers refer to the same element between drawings.

A system 2 for efficient lifting and lowering a load (FIG. 1) comprises four mobile lifting columns 4 in the illustrated embodiment. Lifting columns 4 lift a passenger car 6 from the ground 8. Lifting columns 4 are connected to each other and/or a control system by wireless communication means or alternatively by cables. Lifting columns 4 comprise a foot 10 which can travel on running wheels 12 over ground surface 8 of for instance a floor of a garage or workshop. In the forks of foot 10 is provided an additional running wheel (not shown). Lifting column 4 furthermore comprises a mast 14. A carrier 16 is moveable upward and downward along mast 14. Carrier 16 is driven by a motor 18 that is provided in a housing of lifting column 4. Motor 18 is supplied with power from the electrical grid or by a battery that is provided on lifting column 4 in the same housing as motor 18, or alternatively on foot 10 (not shown). Control with control panel 20 is provided to allow the user of system 2 to control the system, for example by setting the speed for the carrier 16.

Lifting system 2 includes at least two lifting columns 4. Each of the lifting columns has at least one ascent mode and one descent mode, and is under the influence of a control 20. Control 20 can be designed for each lifting column 4 individually, or for the lifting columns 4 together.

Figure 2A:
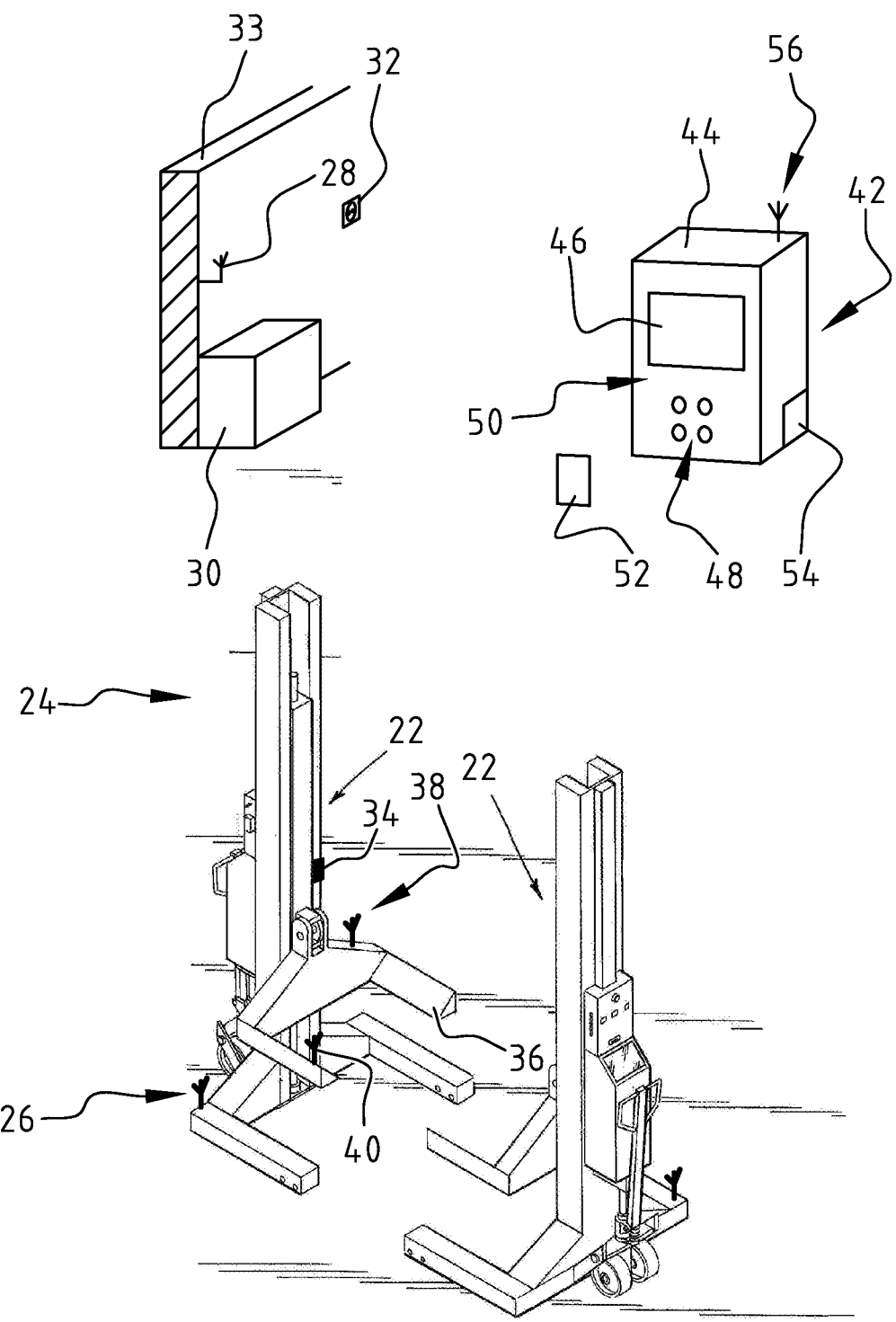
FIG. 2A shows a lifting column according to the invention.

A column 22 (FIG. 2A) of a lifting system 24 is a mobile lifting column that communicates by transmitter-receiver 26 to a transmitter-receiver 28 of a central controller 30. A connection 32 to the electrical grid is provided on a side wall 33 in the neighbourhood of controller 30. Sensor 34 is capable of measuring position and/or speed of carrier 16. The resulting measurement signal is communicated via transmitter 38 to transmitter-receiver 28 of controller 30 directly or indirectly through transmitter-receiver 26. Controller 30 may send data to lifting column 22 such as an activation signal for sensor 34 using transmitter-receiver 28 and receiver 40. It will be understood that transmitters and/or receivers 26, 38, 40 can be combined or separated. In the illustrated embodiments sensor 34 is a potentiometer.

Control system 42 operates as controller for the lifting devices, optionally in cooperation with controller 30, control 20 and/or other control components. In the illustrated embodiment control system 42 comprises housing 44, a display 46, preferably a touch screen, a number of buttons 48, an RFID antenna 50 enabling a user to identify himself with an ID-key 52. Control system 42 further comprises position determining means 54 and communication means 56, preferably providing wireless functionality to communicate in one or more environments such as LAN, WAN, VPN intranet, internet etc., that are schematically shown in the illustrated embodiments. Control system 42 is further provided with input/output ports, such as USB, SD card reader, smart phone communication possibilities etc. to improve the functionality. The output may provide warning signals to the user. Display 46, preferably a TFT-LCD), is protected by a display lens cover of a resilient material, preferably scratch-resistant. In the illustrated embodiment breath analyser 57 (FIG. 1) is integrally or modular provided with control system 42. Alternatively, analyser 57 is provided as a stand-alone application or attached to one of the lifting devices 4. It will be understood that analyser 57 can also be applied to other lifting systems including the embodiments that are illustrated and discussed herein.

In the illustrated embodiment, integrated in control system 42 is a graphical interface builder for on-line building a Graphical Interface Unit (GUI). The configuration and associated information that the GUI provides to the user will be updated based on selected lifting devices for a specific lifting operation. Examples of GUIs are shown in some of the figures.

Figure 2B:
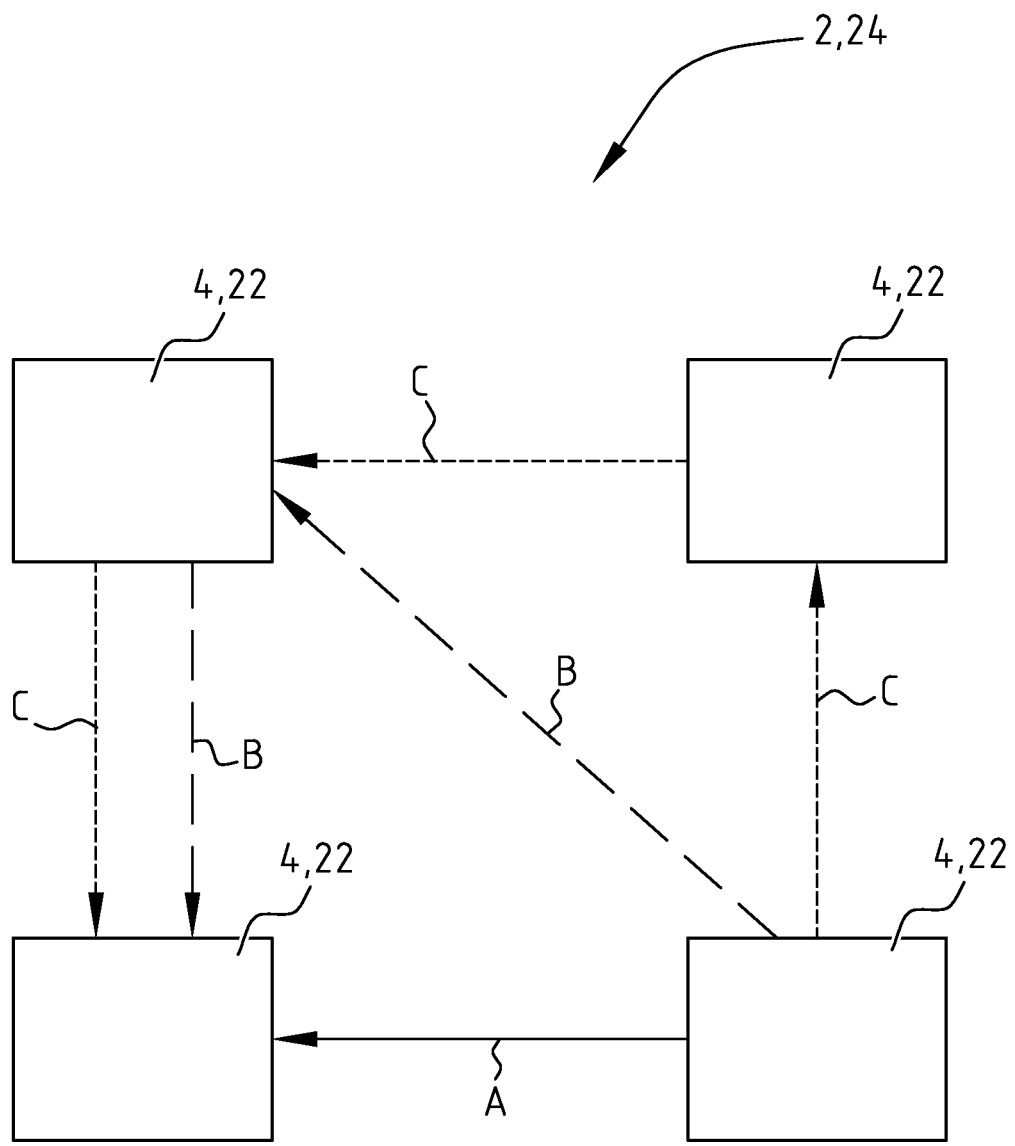
FIG. 2B shows communication routes in the lifting system comprising a number of lifting columns according to the invention.

Communication (FIG. 2B) between lifting columns 4,22 in a lifting system 2,24 may follow a number of different routes. For example, in case communication is required between two lifting columns a direct route A can be used for the communication. In case route A is blocked, hindered or otherwise disturbed an alternative indirect route B can be used for the communication. In this alternative route B another lifting column 4,22 receives and forwards the communication, preferably without reading, writing or performing any action on basis of the communication. In a similar manner another alternative indirect route C can be used involving two, or even more, intermediate lifting columns 4,22. The choice for a specific route A,B,C can be made by a (group) controller. Also, the receiving destination lifting column 4,22 may provide a "message received"-signal thereby ending communication via other routes. It will be understood that a skilled person would know several ways to correctly implement dealing with different routes for communication. The advantage of enabling more than one route for communication is that in case of signal disturbance of signal blocking communication may continue via alternative routes. This provides a robust and stable control of the lifting system 2,24 according to the invention.

Next, an embodiment of the system according to the invention will be described.

If required, a safety message can be displayed first, depending on the service settings. This setting is made in accordance with the safety policy of your company. The rest of the system is not usable, if user management with PIN-code is not selected. The screen is displayed in which the user is requested to log on and select the correct name and tap the name once more. The users have a personal PIN-code, the system has an additional account for service personnel with another PIN-code. For the next step a PIN-code is required.

Figure 3:
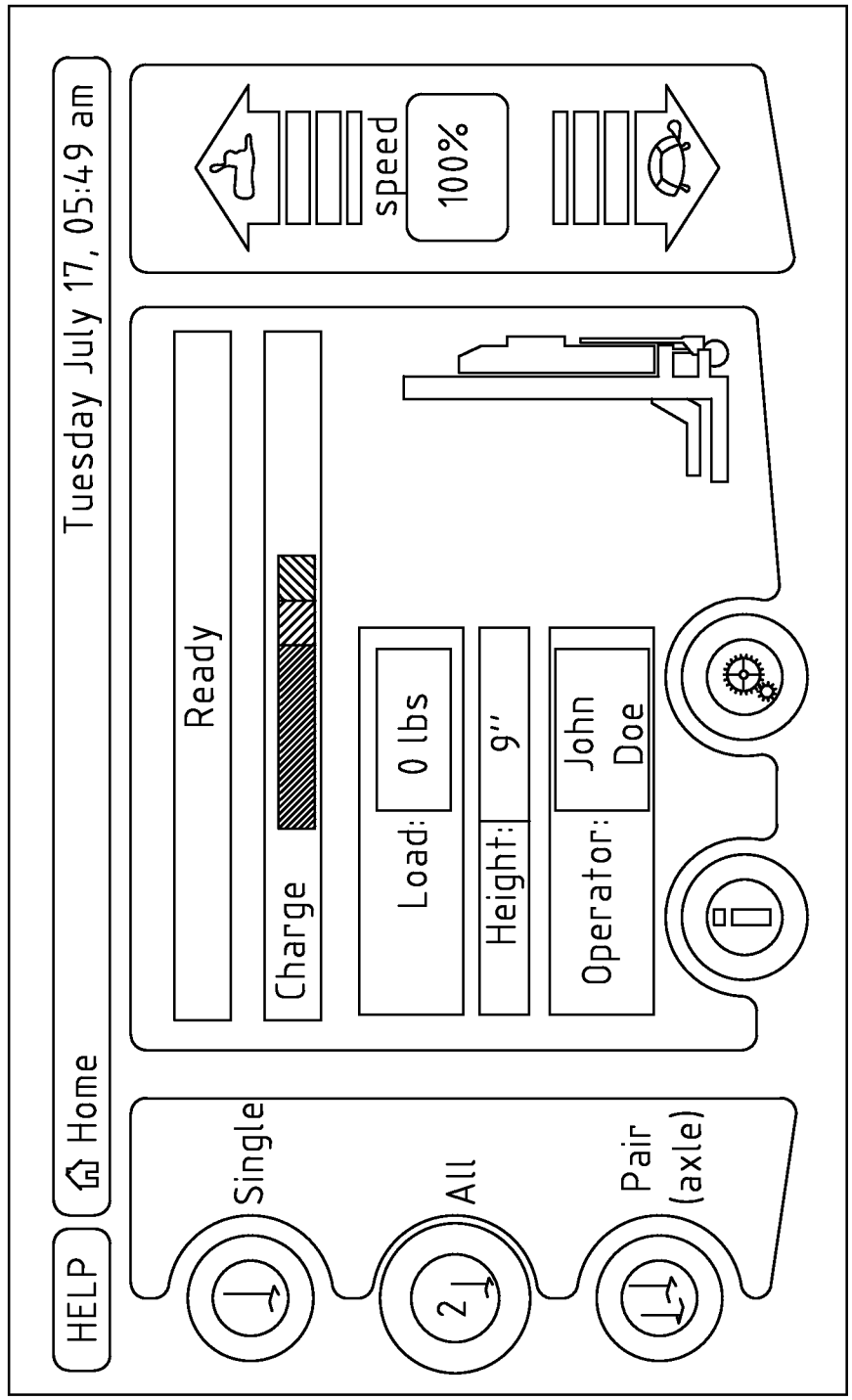
FIGS. 3, 4A and B show displays of the system according to the invention.

If required, a safety message can be displayed, depending on the service settings. This setting is made in accordance with the safety policy of the company. For the next step the user is requested to hold the ID-key 52 in front of the RFID-antenna 50. The antenna is positioned below the screen 46. As long as the ID-key has not been recognized, the display will show "hold ID-key in front of wireless symbol". The user will select each column that he wants to become a part of one lift system. After the ID-key has been recognized for the first time, the display will show "column accepted, proceed to next column or use ID-key to finish". Next, the user holds the ID-key a second time in front of the RFID-antenna at only one of the columns to initialize the lifting system. The columns will be coupled through a wireless network and become one lifting system. This will take approx. 20 sec, during which an animation will be shown. The main screen will be displayed as soon as the animation has ended. An example of the screen is illustrated in FIG. 3, with:

Single—the columns operate independently of each other.
All—the columns operate as one lifting system.
Pair—the columns operate in pairs.
I—go to the information screen.
Settings—go to the settings screen.
Load—switch between load on column and total load on lifting system.
Speed—toggle between 100% en adjustable from 25-99%.

When the user log on is not used (not by PIN-code and not by ID-key either), "Operator" changes in "Owner". The information screen shows the owner's data, and has a button to log out. The push button "Log out" is only displayed when the user log in with PIN-code is used or when workshop manager or service mechanic have logged in.

Figure 4A:
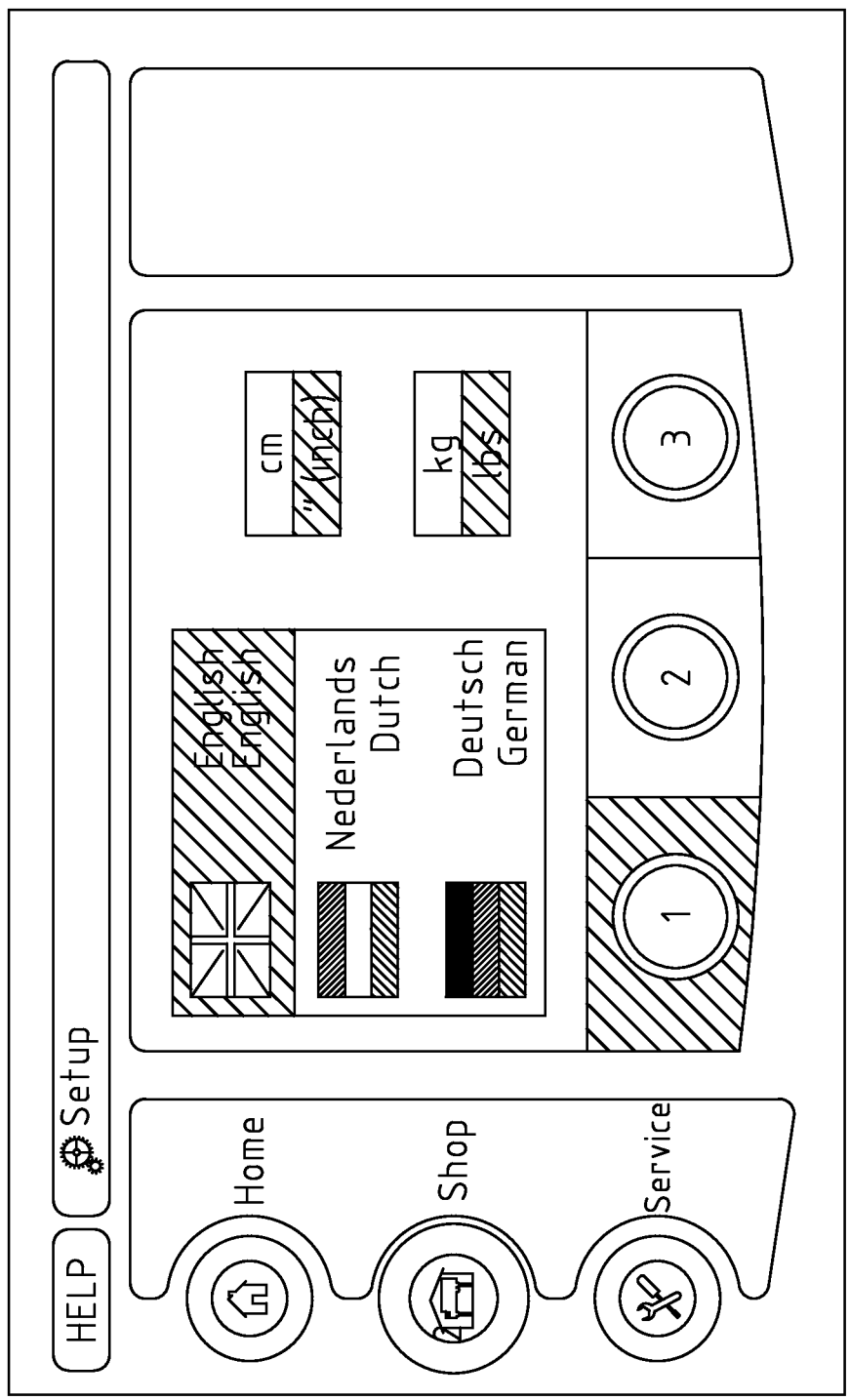

In the illustrated embodiment the system has three screens for changing the operator settings. One of these screens is shown in FIG. 4A. The screen with the workshop settings requires a PIN-code. The screen with the service settings requires another PIN-code. The workshop settings will also be available when this other PIN-code is used. The push button "Users" will activate the screen on which the user data can be managed. The push button "Set clock" will activate the clock adjustment screen. The field "Owner data" contains text blocks for input of the name, address and telephone number of the owner. The "Assign ID-key" is active when the user log in by means of ID-key is selected. This will link the last used ID-key to the selected user. The same screen is used for editing data of an existing user or to enter a new user. Pushing "Escape" will delete the entered data and will return to the user management screen.

Figure 4B:
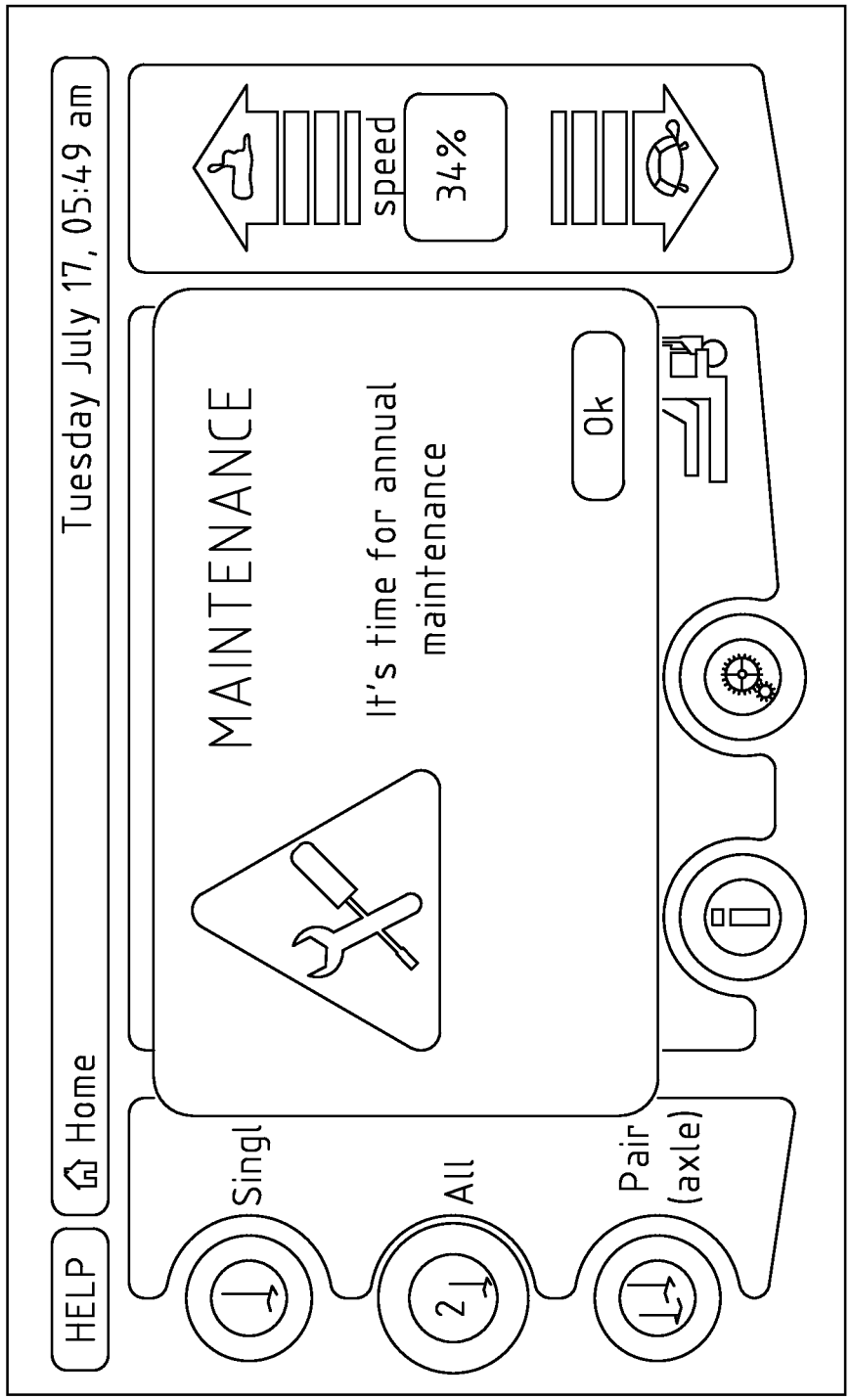

Pushing "Confirm" will save the entered data and will return to the user management screen. To change file path the user taps the file directory name as this will open the file dialogue. The file directory is not shown when message (safety or maintenance) is active. Depending on the settings, a message will be displayed showing that the system requires maintenance. An example thereof is shown in FIG. 4B. "OK" will suppress this message, but it will be shown again after a new start-up of the column. Preferably, only a service mechanic can reset (or switch off) the annual service message. Once it has been reset, it takes a year to pop-up again. The file with a description of the monthly maintenance will open by tapping the "documentation" button.

"Later" will suppress this message, but it will be shown again after a new start-up of the column.

"Done" is a confirmation that the maintenance has been done, the message will disappear, and will pop-up again after one month. Optionally, the display shows a charge indicator with the indicator showing when battery capacity is sufficient for full operation, for example.

To improve the communication with the user and the understanding of the lifting operation, in an embodiment of the invention an increasing number of coloured blocks is shown in animation when the lift is lowering, depending on the actual load and/or the battery is fully charged. Functionality of the column will be reduced when the battery capacity is low. Operation is not possible anymore, when the battery is almost discharged.

Control system 42 and/or lifting system provided therewith preferably meets certification requirements, such as standards implemented by the American National Standards Institute (ANSI). In further non-limiting embodiments it meets the ANSI/ALI and/or ALCTV EN 1493/CE certification standards. It will be understood that alternative embodiments according to the invention can be envisaged.

The present invention can be applied to the (wireless) lifting columns illustrated in FIGS. 1-2. Alternatively the invention can also be applied to other types of lifting columns and lifting systems.

Figure 5:
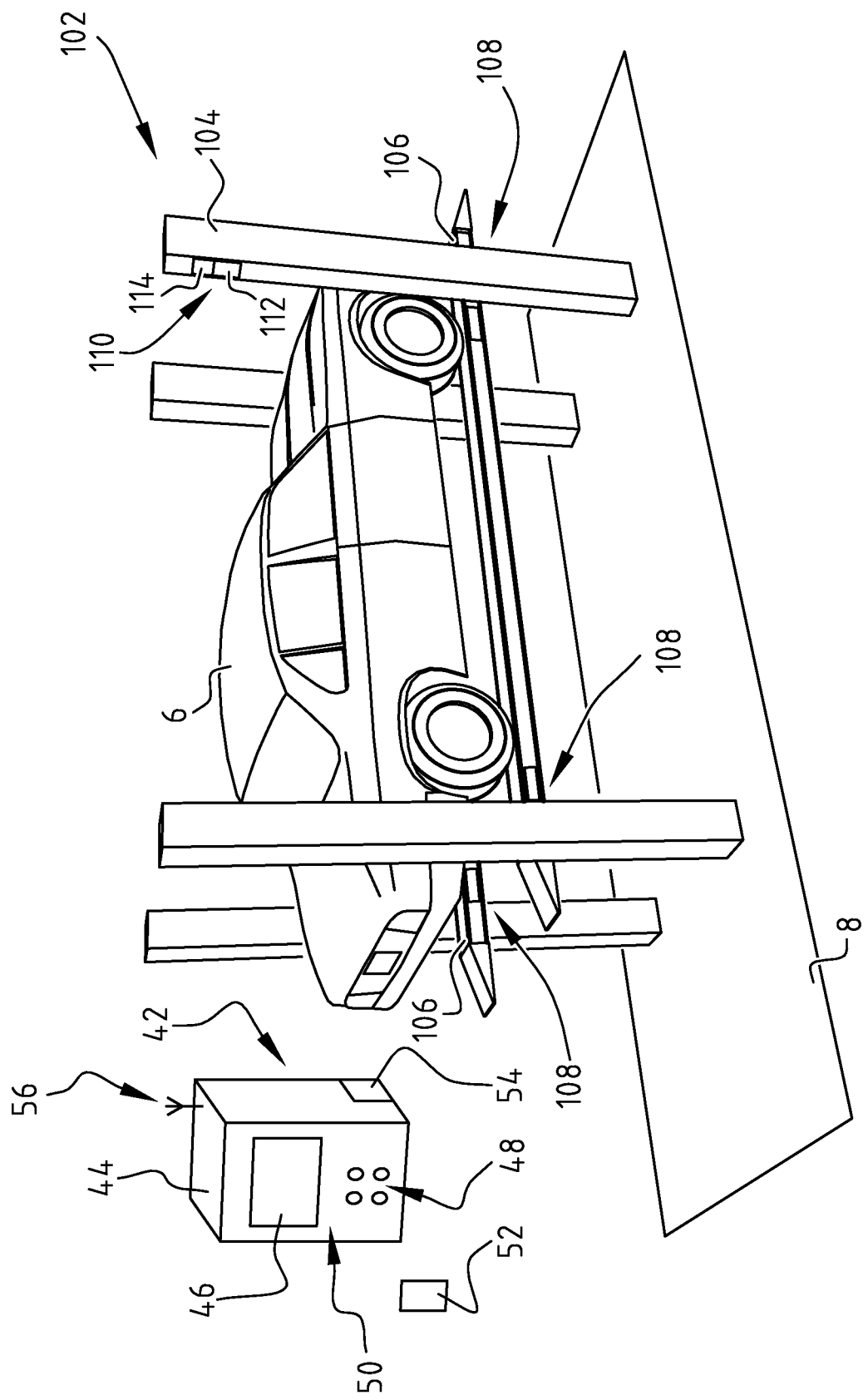
FIGS. 5-9 show alternative embodiments of lifting columns according to the invention.

For example, a four-post lifting system 102 (FIG. 5) comprises four columns 106 carrying runways 106. Columns 104 comprise a sensor 108, preferably each column 104 has one sensor 108. In the illustrated embodiment an indicator 110 with a green light 112 and a red light 114 is provided. Light 110 signals to the driver when vehicle 6 is positioned correctly relative to columns 104 and the vehicle 6 can be lifted. In case each column 104 is provided with sensor 108 the position of the carrier 106 can be checked. This contributes to the overall safety of the lifting operation.

Figure 6:
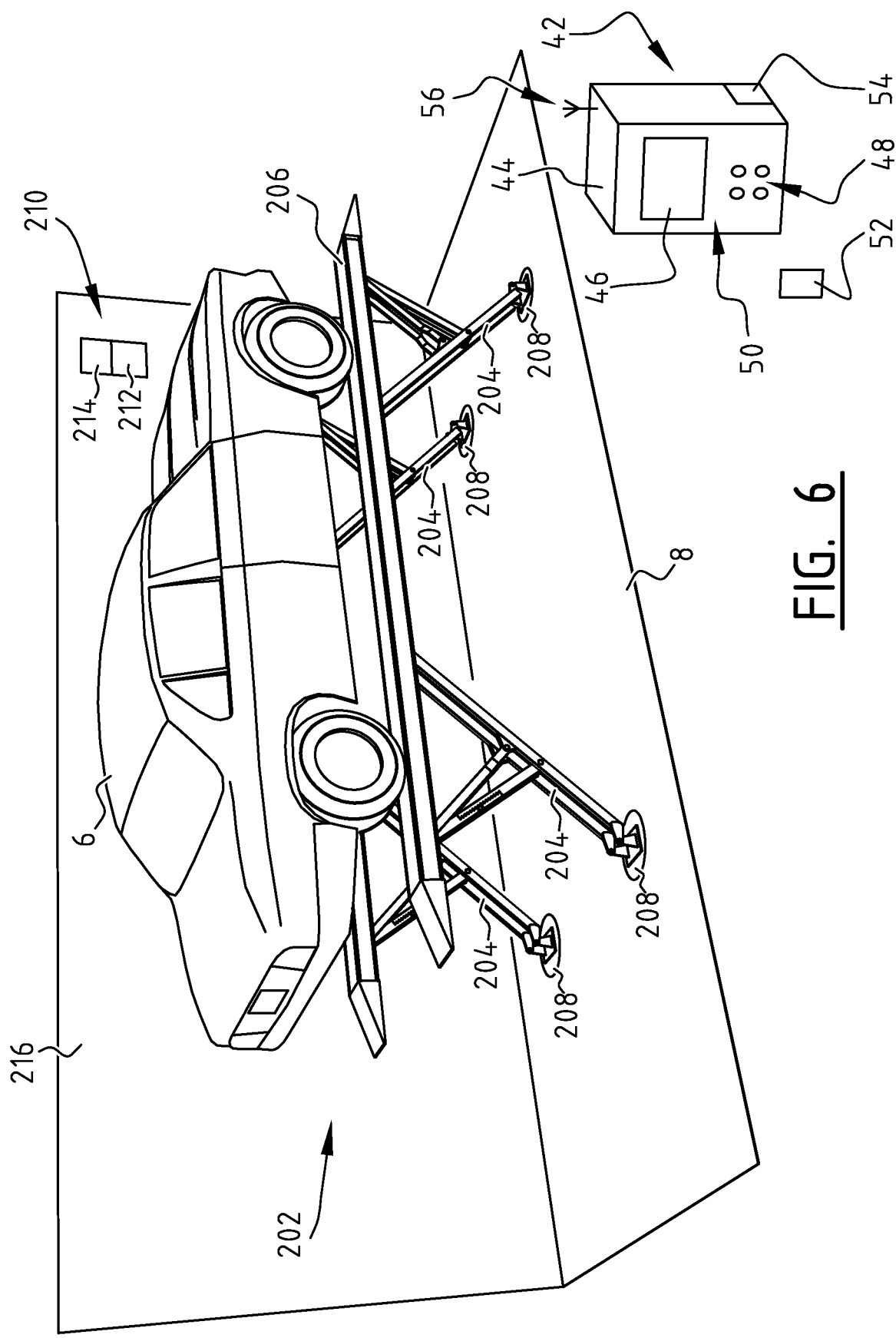

As a further example, lifting system 202 (FIG. 6) comprises a so-called sky-lift configuration with four posts 204 carrying runways 206. In the illustrated embodiment a sensor 208 is provided for every post 204. This enables the check on positioning of the carrier as described earlier. A light 210 with green 212 and red 214 lights can be provided on wall 216 to indicate to the driver of vehicle 6 that the vehicle is positioned correctly or needs to be repositioned.

Figure 7:
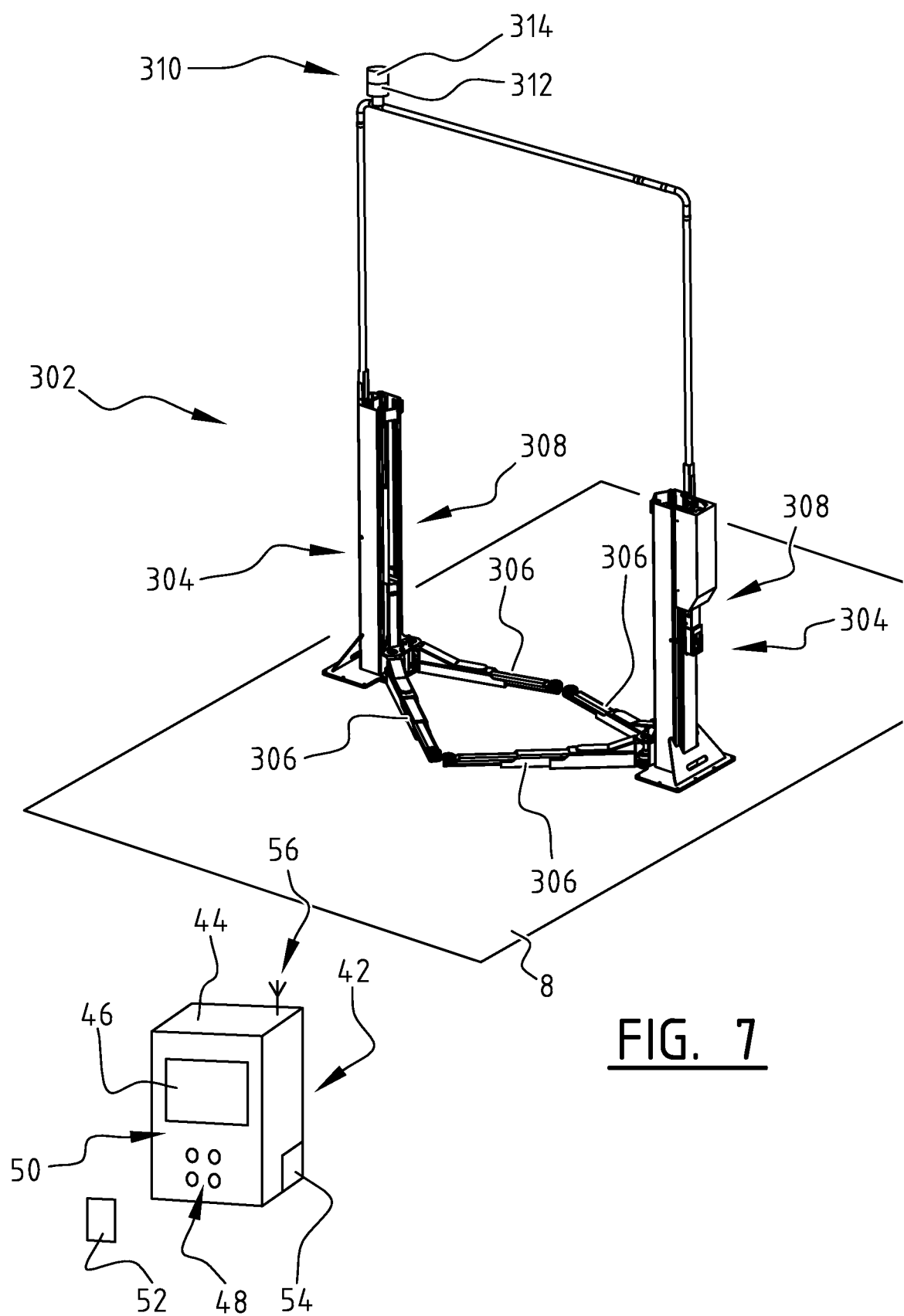

As an even further example, lifting system 302 (FIG. 7) comprises a so-called two-post configuration with two posts 304 that are provided with carrier arms 306. In the illustrated embodiment to measure position and speed of carrier arms 306 sensor 308 is provided. This enables the check on positioning of arms 306 as described earlier. A light 310 with green 312 and red 314 lights can be provided to indicate to the driver of vehicle 6 that the vehicle is positioned correctly or needs to be repositioned.

In the illustrated embodiments control system 42 can be applied obviously including lifting system type specific adaptations.

Figure 8A:
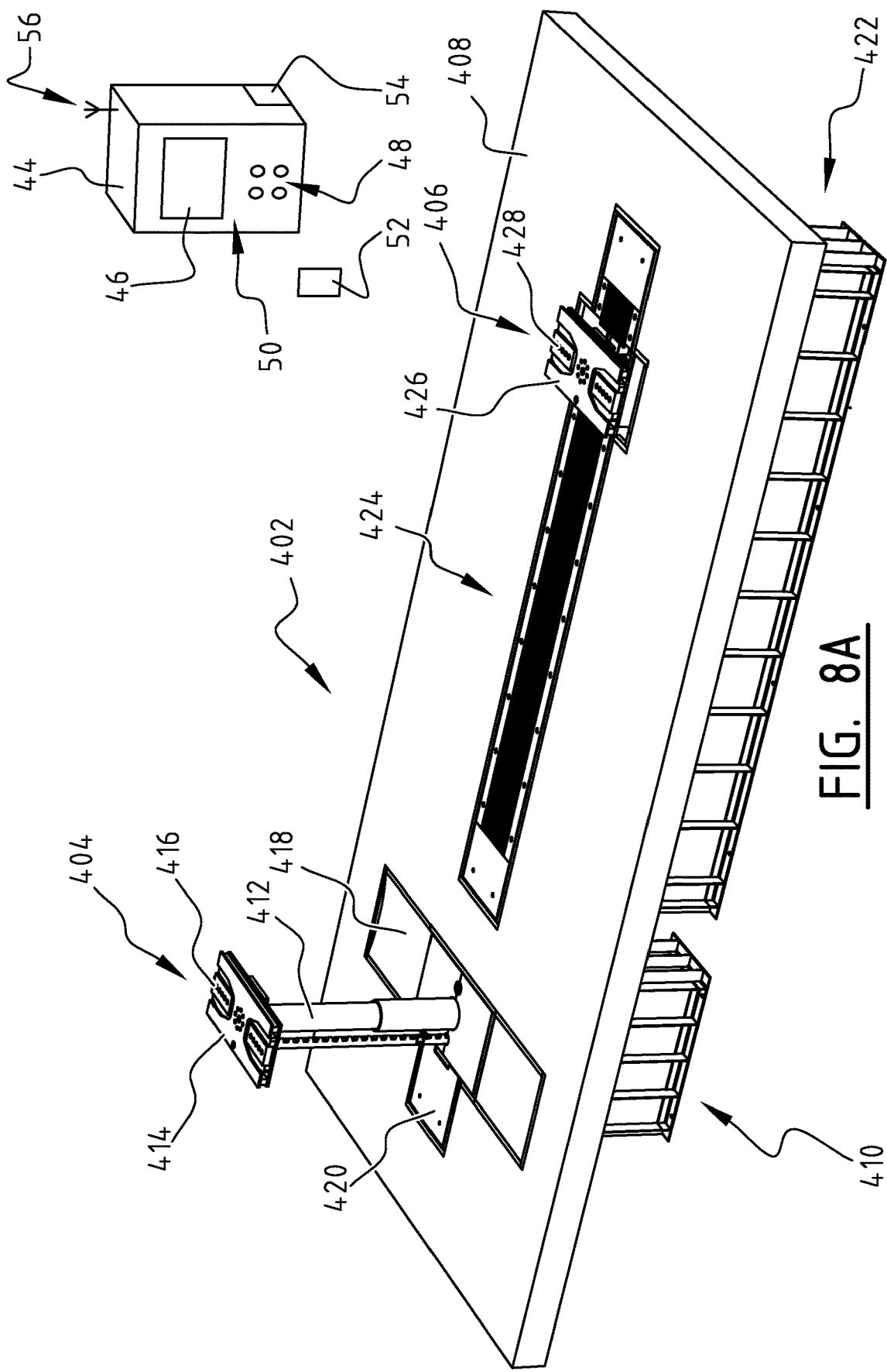
Figure 8B:
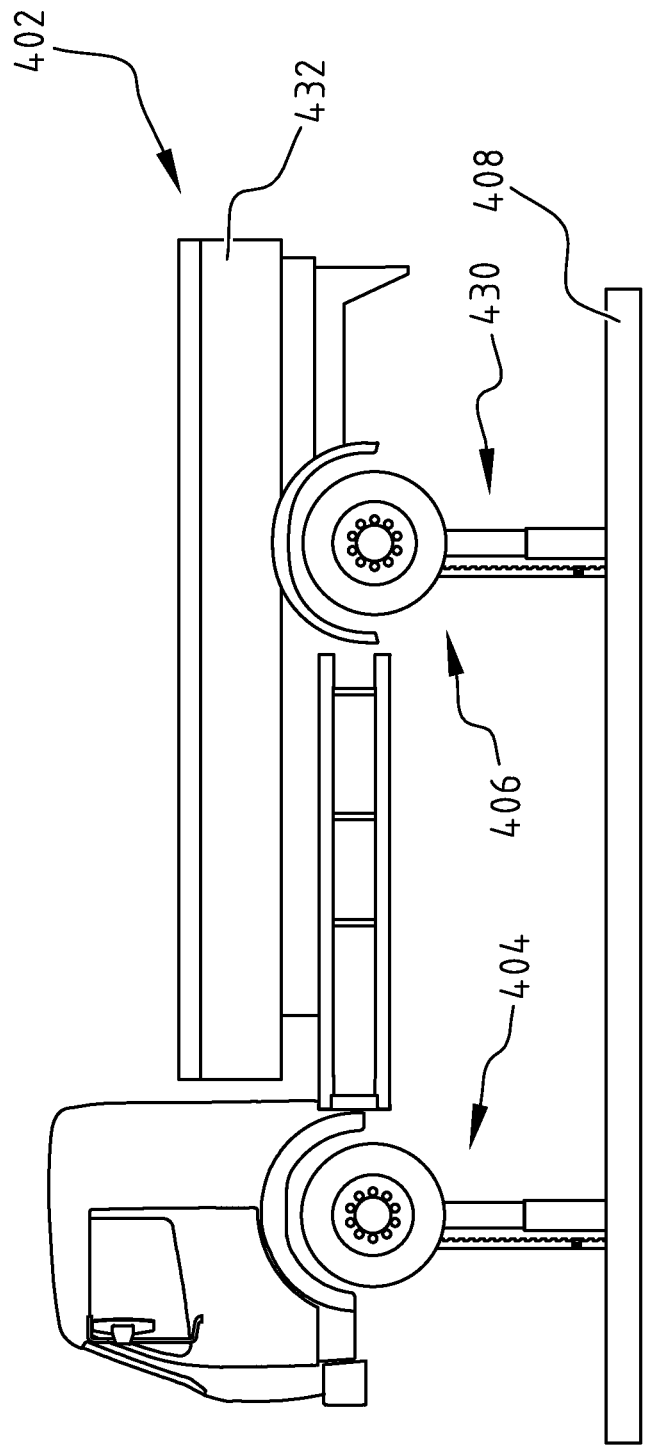

In a further alternative embodiment lifting system 402 (FIG. 8 A-B) is of the in-ground lift type comprising stationary lifting column/device 404 and a moveable lifting column/device 406 that are located on or in floor 408. The front lifting column/device 404 is provided in cassette or box 410 with a telescopic lifting cylinder 412. On top of cylinder 412 there is provided carrier 414 with axle carriers 416. In the illustrated embodiment wheel edges or wheel recesses 418 are provided. Recesses 418 define the position of the front wheels of the vehicle. Furthermore, in the illustrated embodiment a hatch 420 is provided in front of the front lifting column/device 404 for maintenance, for example.

The moveable lifting column/device 406 moves in cassette or box 422 comprising a telescopic lifting cylinder 430. Box 422 provides a pit with a slot or recess 424 for guiding the moveable lifting column/device 406. Moveable lifting column/device 406 is provided with carrier 426 whereon axle carriers 428 are mounted. Depending on the type of vehicle 432 additional adapters can be provided that cooperate with carriers 414, 426 to enable engagement with different axle dimensions.

Figure 9:
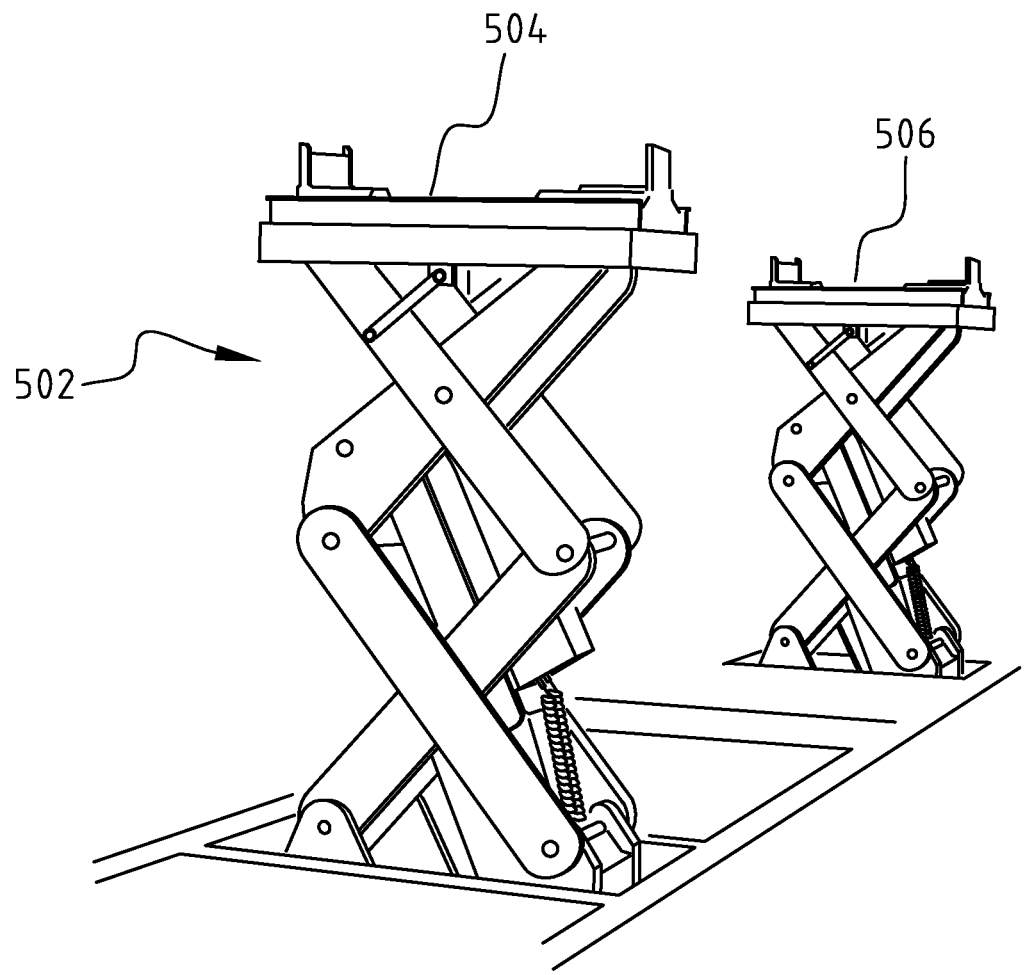

In an alternative lifting system 502 of the in-ground type (FIG. 9) the telescopic lifting cylinders 412, 430 of lifting system 402 are replaced by scissor type lifts 504, 506. It will be understood that operation of lifting systems 402, 502 of the in-ground type is similar.

It will be understood that the invention can be applied to a range of lifting systems, including but not limited to four-post and two-post lifting columns, such as the Stertil-Koni one post lifts ST1075, the Stertil-Koni two post lifts SK 2070, and the Stertil-Koni four post lifts ST 4120, skylift, and mobile columns. Also, it will be understood that additional embodiments of the invention can be envisaged combining and/or switching features from the described and/or illustrated embodiments. For example, instead of light 110, 210, or in addition thereto, sound signals, indications on a control system etc. can be applied.

The present invention is by no means limited to the above described preferred embodiments. The rights sought are defined by the following claims within the scope of which many modifications can be envisaged. The present invention is described using a lifting column and more specifically a mobile lifting column. The invention can also be applied to other type of lifting columns such as so-called boom-lifts, scissor-lifts and loading platforms. Such lifting equipment can be provided with the measures illustrated above according to the invention.

The invention claimed is:

1. A lifting system for lifting a vehicle, the lifting system comprising:
   at least two lifting devices operable to raise and lower the vehicle;
   a group controller arranged to operate the lifting devices;
   a user interface unit comprising a transmitter and/or receiver configured for communication with the group controller, a processor, a display device, and input means configuring the user interface unit to receive user input, wherein the user interface unit being adapted to communicate command signals to the group controller on basis of the user input and adapted to receive and display information obtained from the group controller; and
   a network interface unit comprising a network transmitter and/or network receiver configured for communication to an external network, and a connection configured for communication with the group controller,
   wherein the group controller comprises a communication optimizer for determining an appropriate communication route in the lifting system, wherein the communication optimizer is adapted to select a first communication route to send the command signals from a first lifting device to a second lifting device, and, upon receiving an indication that the first communication route is disturbed, select a second communication route to send the command signals from the first lifting device to the second lifting device, wherein the second communication route is different from the first communication route, and wherein the indication that the first communication route is disturbed comprises an absence of a receipt confirmation within a specified period of time.

2. The lifting system according to claim 1, wherein the communication involves one or more of the following: vehicle documentation, tasks, health and safety information, service and maintenance indication, software updates, utilisation data, authorization and identification data, position data.

3. The lifting system according to claim 2, wherein the group controller comprises a graphical interface builder configured for building appropriate graphical interface in response to the selected lifting devices in the lifting system.

4. The lifting system according to claim 2, wherein the display device comprises a touch-sensitive display.

5. The lifting system according to claim 1, wherein the display device comprises a touch-sensitive display.

6. The lifting system according to claim 5, wherein the touch-sensitive display is adapted to receive multi-touch input.

7. The lifting system according to claim 5, further comprising an ID-reader.

8. The lifting system according to claim 1, wherein the group controller comprises a graphical interface builder configured for building appropriate graphical interface in response to the selected lifting devices in the lifting system.

9. The lifting system according to claim 1, further comprising an ID-reader.

10. The lifting system according to claim 1, further comprising a breath analyser.

11. The lifting system according to claim 1, further comprising a positioning system for carrying out a location determination of each lifting device.

12. The lifting system according to claim 11, further comprising an identification system co-operating with the controller for identifying at least each selected lifting device on the basis of the position determinations.

13. The lifting system according to claim 1, wherein one lifting device is configured as master device and at least one lifting device as slave device.

14. The lifting system according to claim 1, wherein the first communication route is a direct communication route from the first lifting device to the second lifting device and the second communication route is an indirect communication route wherein at least one intermediate lifting device receives the command signals from the first lifting device and forwards the command signals to the second lifting device.

15. A method for operating a lifting system, comprising the steps:
providing a lifting system according to claim 1;
selecting, by the communication optimizer, a first communication route to send the command signals from a first lifting device to a second lifting device;
receiving, at the communication optimizer, an indication that the first communication route is disturbed, wherein the indication that the first communication route is disturbed comprises an absence of a receipt confirmation within a specified period of time;
selecting, by the communication optimizer, a second communication route to send the command signals from the first lifting device to the second lifting device, wherein the second communication route is different from the first communication route; and
lifting a vehicle.

16. The method according to claim 15, further comprising the steps of:
generating a graphical user interface (GUI) from at least one processor, the GUI being displayed in at least one display device of the user interface unit;
receiving input from at least one user; and
altering at least one function of the lift based on the input of at least one user.

17. The method of claim 15, further comprising the step of remotely accessing the user interface unit.

18. The method of claim 15, further comprising the steps of:
identifying a user by associating the user with an ID-means presented to an ID-reader; and
receiving user input associated with system settings on the display.

19. The method according to claim 15, wherein the first communication route is a direct communication route from the first lifting device to the second lifting device and the second communication route is an indirect communication route wherein at least one intermediate lifting device receives the command signals from the first lifting device and sends the command signals to the second lifting device.

20. The method of claim 19, further comprising the steps of:
receiving, at the communication optimizer, an indication that the second communication route is disturbed; and
selecting, by the communication optimizer, a third communication route to send the command signals from the first lifting device to the second lifting device, wherein the third communication route is different from both the first and second communication routes.

* * * * *